United States Patent
Moyer et al.

(10) Patent No.: US 9,003,158 B2
(45) Date of Patent: Apr. 7, 2015

(54) FLEXIBLE CONTROL MECHANISM FOR STORE GATHERING IN A WRITE BUFFER

(71) Applicant: Freescale Semiconductor, Inc., Austin, TX (US)

(72) Inventors: William C. Moyer, Dripping Springs, TX (US); Quyen Pho, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 186 days.

(21) Appl. No.: 13/656,073

(22) Filed: Oct. 19, 2012

(65) Prior Publication Data

US 2014/0115280 A1 Apr. 24, 2014

(51) Int. Cl.
- *G06F 12/02* (2006.01)
- *G06F 12/04* (2006.01)
- *G06F 9/30* (2006.01)

(52) U.S. Cl.
CPC ............ *G06F 12/04* (2013.01); *G06F 9/30043* (2013.01)

(58) Field of Classification Search
None
See application file for complete search history.

(56) References Cited

U.S. PATENT DOCUMENTS

| | | | |
|---|---|---|---|
| 5,471,598 A | 11/1995 | Quattromani et al. | |
| 5,615,402 A | 3/1997 | Quattromani et al. | |
| 5,740,398 A | 4/1998 | Quattromani et al. | |
| 5,907,860 A | 5/1999 | Garibay, Jr. et al. | |
| 6,219,773 B1* | 4/2001 | Garibay et al. | 711/201 |
| 8,131,951 B2 | 3/2012 | Moyer et al. | |
| 2008/0235459 A1* | 9/2008 | Bell et al. | 711/140 |
| 2009/0138659 A1* | 5/2009 | Lauterbach | 711/119 |
| 2013/0046933 A1 | 2/2013 | Le et al. | |
| 2014/0095779 A1* | 4/2014 | Forsyth et al. | 711/105 |
| 2014/0143471 A1 | 5/2014 | Moyer et al. | |
| 2014/0143500 A1 | 5/2014 | Moyer et al. | |

OTHER PUBLICATIONS

Non-Final Office Action—U.S. Appl. No. 13/682,350; Jun. 13, 2014; 17 pgs.
Notice of Allowance mailed Dec. 9, 2014 for U.S. Appl. No. 13/682,350; 9 pages.

\* cited by examiner

*Primary Examiner* — Jared Rutz
*Assistant Examiner* — Brendan Lillis

(57) ABSTRACT

A store gathering policy is enabled or disabled at a data processing device. A store gathering policy to be implemented by a store buffer can be selected from a plurality of store gathering polices. For example, the plurality of store gathering policies can be constrained or unconstrained. A store gathering policy can be enabled by a user programmable storage location. A specific store gathering policy can be specified by a user programmable storage location. A store gathering policy can be determined based upon an attribute of a store request, such as based upon a destination address.

21 Claims, 6 Drawing Sheets

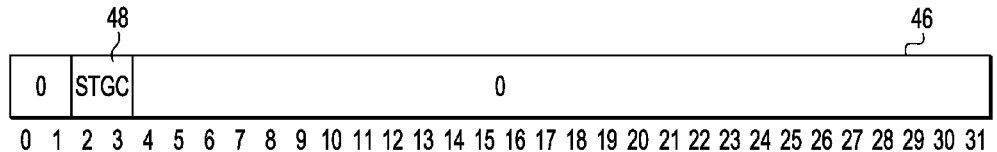

FIG. 3

| TABLE 0-1 CONTROL REGISTER FIELD DESCRIPTIONS ||| 
|---|---|---|
| BITS | NAME | DESCRIPTION |
| 0.1 | — | RESERVED |
| 2.3 | STGC | STORE GATHER CONTROL<br>00 - DEFAULT OPERATION - IMPLEMENTATION DEFINED, FOR STORE GATHERING IS DISABLED.<br>01 - STORE GATHERING IS ENABLED. NO CONSTRAINTS ON ALIGNMENT OR REQUIREMENT TO BE CONTIGUOUS. EXTERNAL BUS WRITE ACCESSES FOR GATHERED STORES MAY HAVE NON-CONTIGUOUS BYTE STROBES ASSERTED.<br>10 - STORE GATHERING IS ENABLED. GATHERED STORES ARE REQUIRED TO BE CONTIGUOUS ONCE GATHERED. CACHE HIT DATA FROM A STORE ACCESS LOCKUP MAY BE USED TO PROVIDE ADJACENT STORE DATA TO INCREASE GATHERING OPPORTUNITIES. EXTERNAL BUS WRITE ACCESSES FOR GATHERED STORES WILL NOT HAVE NON-CONTIGUOUS BYTE STROBES ASSERTED.<br>11 - USE ADDRESS RANGE TABLES |
| 4.31 | — | RESERVED |

FIG. 4

FLEXIBLE CONTROL MECHANISM FOR STORE GATHERING IN A WRITE BUFFER

FIELD OF THE DISCLOSURE

The present disclosure relates generally to data processing devices, and more particularly to utilization of write or store buffers for data processing devices.

BACKGROUND

In many data processing devices, a store buffer is used to decouple the retirement of store operations to a system bus from a processor or cache of a data processor. The store buffer can contain a number of entries, each of which can store address information, data information, and control information that are to be provided to a bus interface unit during a write operation to memory connected to the system interconnect. In some example embodiments, a cache may be implemented between the store buffer and the processor of the data processing device to facilitate memory accesses by the processor.

BRIEF DESCRIPTION OF THE DRAWINGS

The present disclosure may be better understood, and its numerous features and advantages made apparent to those skilled in the art by referencing the accompanying drawings.

FIG. 3 is a diagram of the control register of FIG. 1 in accordance with one embodiment of the present disclosure.

FIG. 4 is a table showing example descriptions of the control register settings for the control register of FIG. 3 in accordance with one embodiment of the present disclosure.

DETAILED DESCRIPTION

FIGS. 1-8 illustrate example systems and techniques for determining a store gathering policy for store buffer entries at a data processing device. Each store buffer entry width may typically be the size of the largest store request generated by the central processing unit. Alternatively, the store buffer entry width may be the same width as the external data bus that the store buffer interfaces with to store data information and store requests at an attached memory location. Store buffer entry width may also correspond to both the largest store request and data bus width. Thus, multiple store requests targeting a data location, which are smaller than the store buffer entry width, may be gathered and stored in the same store buffer entry.

Gathering of store requests may reduce the number of store buffer entries occupied by store requests for certain sequences of instructions executed by the central processing unit. Gathering can also reduce the number of system bus write operations performed to retire stores to the target location on the system bus. Gathering may be constrained or unconstrained, depending upon the attributes of the device at the destination location and the types of interfaces used by the data processing device. Due to the possible variety of constraints placed on gathering, store gathering policies are selected to meet the system interface constraints or for other operational reasons. Store buffer control circuitry may select a gathering policy based upon a control setting that may be user programmed or determined based on a destination address or attributes of a device at a destination address. The store buffer will implement the gathering policy prior to providing store requests from store buffer entries to the interface of the data processing device, for example, a bus interface unit (BIU).

Figure 1:
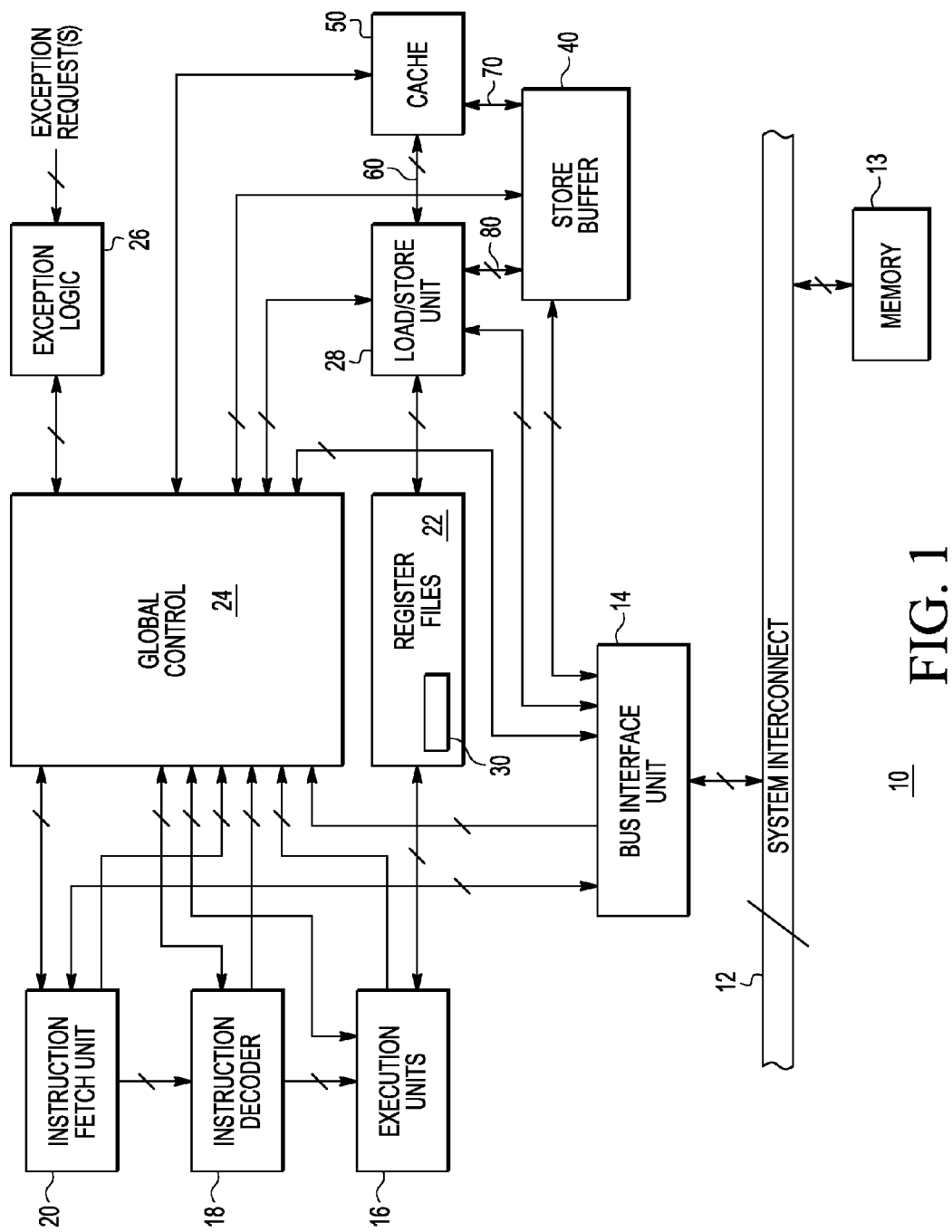
FIG. 1 is a block diagram illustrating a data processing device in accordance with a specific embodiment of the present disclosure.

FIG. 1 illustrates an embodiment of a data processing system 10 which determines a store gathering policy for gathering store requests in a store buffer to reduce write operations to a system interconnect 12 which stores the gathered store request data information in memory 13. A system interconnect 12 functions to communicate data within the data processing system 10. In one embodiment, system interconnect 12 may be implemented as a multiple-bit system bus. Alternatively, it may be implemented as a cross-bar switch, or as a point-to-point or other interconnection mechanism. A system memory 13 is connected to system interconnect 12 for storage of information in data processing system 10. A bus interface unit (BIU) 14 has a first input/output connected to the system interconnect 12.

Data processing system 10 also includes one or more execution units 16, an instruction decoder 18, an instruction fetch unit 20, register files 22, global control 24, exception logic 26, a load/store unit 28, store buffer circuitry 40, and cache circuitry 50. A second input/output of BIU 14 is connected to a first input/output of instruction fetch unit 20. An output of BIU 14 is connected to a first input of global control 24. A third input/output of BIU 14 is connected to a first input/output of load/store unit 28. A fourth input/output of BIU 14 is connected to a first input/output of buffer 40. A second input/output of instruction fetch unit 20 is connected to a first input/output of global control 24. A first output of instruction fetch unit 20 is connected to a second input of global control 24. A second output of instruction fetch unit 20 is connected to an input of instruction decoder 18. An input/output of instruction decoder 18 is connected to a second input/output of global control 24. A first output of instruction decoder 18 is connected to a third input of global control 24. An output of execution units 16 is connected to a fourth input of global control 24. A second output of instruction decoder 18 is connected to a first input of execution units 16. A third input/output of the global control 24 is connected to a first input/output of execution units 16. A second input/output of execution units 16 is connected to a first input/output of registers files 22. Register files 22 include one or more register files 30. A fourth input/output of global control 24 is connected to an input/output of exception logic 26. Exception logic 26 also has an input for receiving exception requests. A fifth input/output of global control 24 is connected to a second input/output of cache 50. A sixth input/output of global control 24 is connected to a second input/output of buffer 40. A seventh input/output of global control 24 is connected to a second input/output of load/store unit 28. A third input/output of load/store unit 28 is connected to a second input/output of register files 22. A fourth input/output of load/store unit 28 is connected to a third input/output of cache 50. A fifth input/output of load/store unit 28 is connected to a third input/output of buffer 40. A fourth input/output of cache 50 is connected to a fourth input/output of buffer 40. An eighth input/output of global control 24 is connected to a fifth input/output of BIU 14. It should be understood that the location of control circuitry within the data processing system 10 is implementation specific. For example, various control circuitry will be located within each of the functional units of instruction fetch unit 20, instruction decoder 18, execution units 16, register files 22, cache 50, and buffer 40 for more limited control than global control 24. It will be appreciated that each of the illustrated interconnects are presumed to be implemented by one or more conductors.

In operation, global control 24, instruction fetch unit 20, instruction decoder 18, execution units 16, exception logic 26, register files 22, load/store unit 28, BIU 14, system interconnect 12, and memory 13 all operate as known in the art and will not be described in more detail herein except to the extent needed to describe operation of buffer circuitry 40 or cache circuitry 50. Details of buffer circuitry 40 or cache circuitry 50 will be discussed with respect to FIGS. 2-8. Note that all of system 10 can be located on a single integrated circuit, such as an integrated circuit die or package, or may be located on a plurality of integrated circuits. Also, note that a variety of different architectures may be used which includes buffer circuitry, optional cache circuitry, or combination cache and buffer circuitry.

Figure 2:
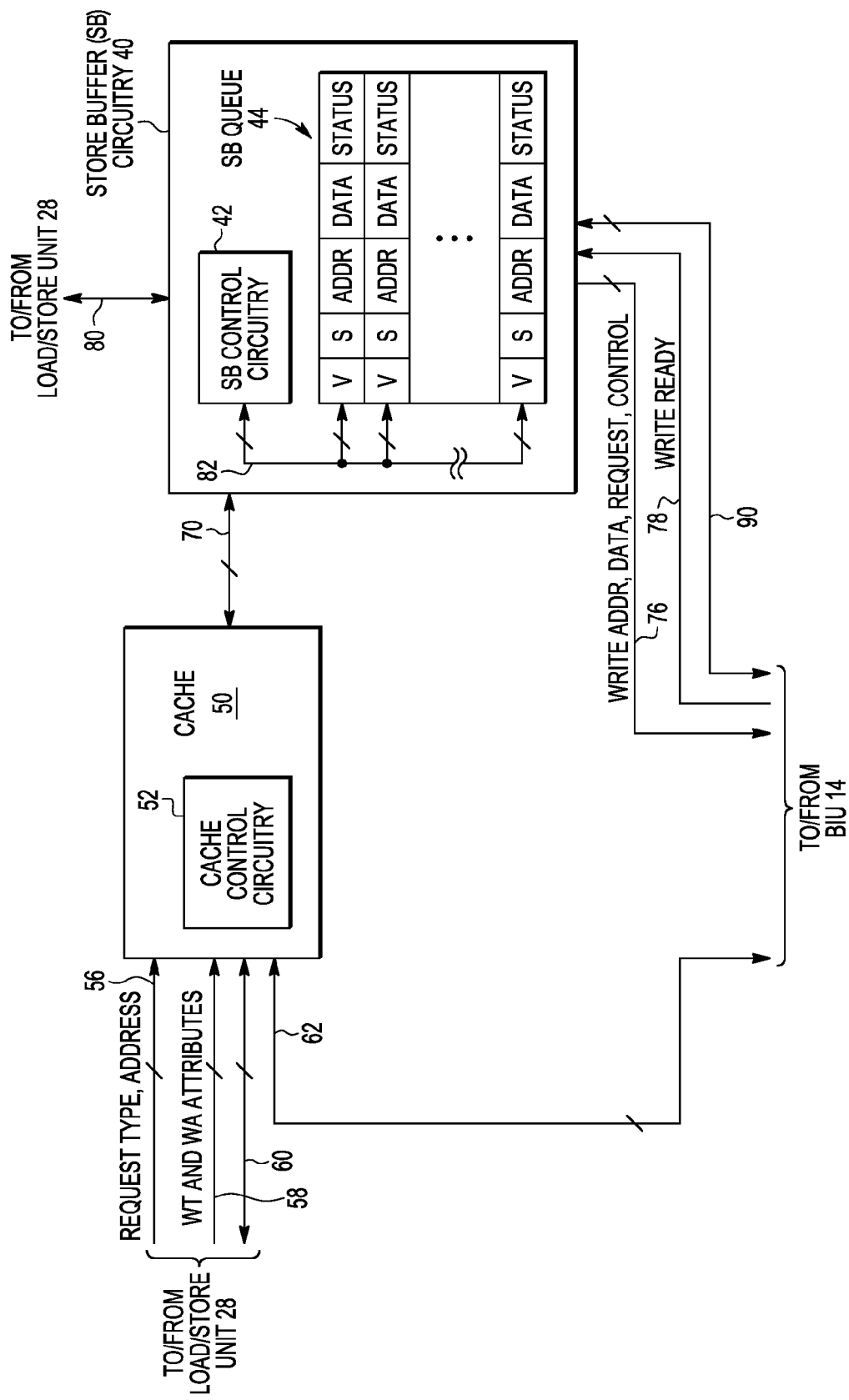
FIG. 2 is a diagram of a store buffer of FIG. 1 in accordance with one embodiment of the present disclosure.

FIG. 2 illustrates, in block diagram form, a portion of store buffer 40 and optional cache circuitry 50 of data processing system 10, in accordance with one embodiment of the present disclosure. Store buffer 40 includes store buffer control circuitry 42 and is bidirectionally coupled to each of load/store unit 28, and BIU 14. Store buffer control circuitry 42 in store buffer 40 is coupled, via conductors 82, to each entry of store buffer queue 44 such that store buffer control circuitry 42 can update appropriate fields of a selected entry, as needed, and can output the next entry to BIU 14.

Store buffer 40 may receive store requests and data words to be written to memory 13 from load/store unit 28. Therefore, store buffer 40 can receive a corresponding request address, a writethrough (WT) attribute, and a write allocate (WA) attribute corresponding to each store request via interconnect 80. Store buffer 40 provides a write address, write data, a write request, and write control to BIU 14 via interconnect 76, which can then be communicated to system interconnect 12 by BIU 14. Store buffer 40 also receives a write ready signal from BIU 14 via interconnect 78 which can be communicated from system interconnect 12 by BIU 14. Other signals may be communicated, as needed between system interconnect 12 (and, e.g., memory 13) and store buffer 40 via BIU 14 via conductors 90.

Store buffer queue 44 can be implemented in hardware in various manners, including as a circular queue. Each entry in store buffer queue 44 includes a valid bit (V), a store type bit (S), an address field (ADDR), a data field (DATA), and associated status information (STATUS). In the illustrated embodiment, each data field has a size of eight bytes (a doubleword) and when the constrained gathering policy is used, the status information includes size information of the valid store data that is within the data field. In the alternative, when unconstrained gathering is used, the status information may include byte strobe flags indicating the bytes of altered (valid) data. In one embodiment, the S bit of an entry of store buffer queue 44 indicates whether that entry is a writethrough entry that stores a writethrough store access, (a writethrough entry) or is a copyback entry that stores a store access.

Store requests may be cacheable or non-cacheable. Entries in the store buffer may be allocated in response to a writethrough store operation, e.g., a store request, issued by a data cache 50 in the data processing device 10. Alternatively, entries of the store buffer may be allocated in response to a store request issued by the processor pipeline directly to the store buffer 40. For example, a load-store unit 28 may issue the store request directly to store buffer 40 via interconnect 80.

Store buffer 40 is used for buffering store requests prior to providing them to the system bus interface unit (BIU) 14 and the system bus interconnect 12 for storage into memory 13. The store buffer 40 enables decoupling the retirement of a store operation to the system bus interface unit from operation of the processor pipeline or cache. For example, a store request by the load/store unit 28 to the memory 13 is considered complete once the request has been made to the store buffer 40, thus allowing the pipeline to continue execution even though the data information has not yet been stored at the memory 13. The store buffer 40 contains multiple entries in store buffer queue 44. As described above, store buffer entries hold store addresses, data, and control and status information.

Control or status information of a store buffer entry may contain data size indicators (flags) indicating the size of the valid data information stored in the store buffer entry. Since the store buffer entry data field width is as large as the size of the largest store operation performed by load/store unit 28 (e.g. 8 bytes, or a doubleword), when a narrower width store is generated (such as a byte, halfword (2 bytes) or word (4 bytes) store), only a certain portion of the data field will hold altered (valid) data for the store. The data size indicators thus are used to indicate the size of the currently buffered data. An individual store buffer entry will be allocated for each write operation, regardless of the store data size, when no gathering is used, which results in the store buffer 40 executing a separate store request to the BIU 14 to complete each store operation. However, to reduce the number of occupied store buffer entries and write operations to the system bus, store requests may be gathered in the store buffer. Through the use of gathering, multiple store requests targeting a data location on system bus 12, which are smaller than the store buffer entry width, can be stored in the same store buffer entry of store buffer queue 44.

Gathering of store requests reduces the number of store buffer entries occupied by store requests by condensing multiple store requests targeted to a location in one store buffer entry. This frees up store buffer entries in the store buffer queue 44. Additionally, only one system bus write operation to the target data location 13 needs to be performed by the store buffer 44 to retire an entry of the store buffer 44 containing data information from multiple stores.

Store buffer control circuitry 42 conducts gathering at the store buffer 40. When a new store request is received at the store buffer 40, store buffer control circuitry compares the address of the incoming store request with addresses for store requests already stored in allocated store buffer entries. If an address match is detected, the incoming store request is allocated to the entry with the matching address. If no address match is made with a store buffer entry, the store buffer control circuitry 42 allocates a new entry. In an alternative embodiment, address tags may be assigned to store buffer entries for comparison of addresses.

Gathering may be constrained or unconstrained. Constrained versus unconstrained gathering may have tradeoffs for power consumption and performance characteristics of the data processing system 10. Constrained and unconstrained gathering may also be determined based on constraints with the system interface such as BIU 14, system bus 12, and memory 13.

In the unconstrained case, any store request or portion of a store request may be gathered into a store buffer entry. The gathered data information may be stored at non-adjacent bytes of the store buffer entry, where the byte locations in between the stored data information does not store current data, e.g., they do not contain data that is to be stored and therefore is invalid. According to an embodiment, the unconstrained case utilizes byte strobe signaling to communicate the location of the valid stored data information in the store buffer entry since the bytes of data information need not be aligned and contiguous. In particular, each entry of the store buffer 44 includes a byte strobe flag that indicates bytes of an entry containing valid data. Such a byte strobe flag field can be sparse, e.g., contain invalid byte locations between valid byte locations, thereby indicating gaps in the data information stored in the store requests of a store buffer entry. In one embodiment, the byte strobe field may consist of eight bits, where each bit corresponds to a byte position in the data field of a store buffer entry. Thus, if the bytestrobe field indicates a value of 10110000, bytes 0, 2, and 3 of the data field are valid, and correspond to stores received by and gathered into the entry. The interface between the store buffer 44 and the destination device, e.g., memory 13, needs to be able to handle bytestrobe signaling and processing, in which sparse byte strobe encodings are possible; otherwise, the unconstrained gathering case may be unavailable.

In the constrained case, byte strobe signaling is not used, and, therefore, data information gathered into a store buffer entry must be contiguous and aligned. Gathering store requests is thus constrained based on particular sizes of the store requests or alignment of gathered store requests. A data size flag can be used to indicate the number of contiguous and aligned bytes of data information stored in a store buffer entry pursuant to one or more store requests. For example, the status field of an entry can be used to store a size indicator instead of a byte strobe flag for data stored at a buffer entry, wherein the size indicator indicates the size and alignment constraints on the gathered store requests. In one embodiment, the size indicator may consist of two bits which encode the size of the valid data in the entry as 00=byte, 01=halfword, 10=word, and 11=doubleword.

Store buffer control circuitry 42 may select a gathering policy to accommodate unconstrained gathering, constrained gathering or no gathering. The gathering policy can be selected based upon a user programmed control setting, or based on one or more of the following: a destination address of a destination device, attributes of a destination device; attributes of a store buffer entry; and the like. Whether or not gathering is selected, and if so, whether the gathering is to be constrained or is allowed to be unconstrained can depend on the type of external interfaces used throughout the data processing device to communicate particular data information. The need for constrained gathering may arise based on bus bridges used, system peripheral interfaces, or memory interfaces. In an embodiment, certain of these elements may not support the use of individual byte strobe signals, but may only utilize an encoded size field as previously described. For example, flash memory interfaces, SRAM interfaces, peripheral bridge interfaces, DMA unit interfaces, Nexus Debug Unit interfaces, and other interfaces may impact constraints placed upon the store request gathering. Attributes and capabilities of devices at destination data locations on the system bus can also affect the existence or type of constraints that may apply to gathering the store requests.

A store gathering policy indicator may be set to determine the store gathering policy to be implemented. The store gathering policy indicator can be set to indicate if no store gathering occurs, if store gathering is constrained, or if store gathering is unconstrained. The store gathering policy indicator can also be set such that the store buffer 40 determines a gathering policy based upon the destination address of the store operation or the attributes of the device located there.

In the illustrated embodiment, data processing system 10 includes a cache 50. Cache 50 includes cache control circuitry 52 and is bidirectionally coupled to each of load/store unit 28, store buffer 40, and BIU 14. Although all inputs and outputs are illustrated as going to or coming from cache 50, some or all of the inputs or outputs may be going directly to or directly from cache control circuitry 52 within cache 50.

When a cache 50 is implemented in data processing system 10, cache 50 can receive load and store requests from load/store unit 28. Therefore, cache 50 receives a request type (indicating, for example, a store or load type) and a corresponding request address via conductors 56. Each store request has a corresponding store address (provided by conductor 56) and associated attributes, and may also be referred to as a store access or a write access. Cache 50 also receives a writethrough (WT) attributes and a write allocate (WA) attributes corresponding to each load and store request via conductors 58. These attributes can be provided for each store request in a variety of different ways, as known in the art. For example, they may be provided from load/store unit 28 for each store request. Alternatively, they may be provided by a memory management unit (MMU) (not shown), where each memory page has a particular set of attributes. In this case, the memory page which the store request is accessing indicates the values of WT and WA. In yet another example, cache control circuitry 52 may generate or provide the WT and WA attributes. Other signals may be communicated between load/store unit 28 and cache 50 via bidirectional conductors 60. For example, data may be communicated via a data port of cache 50. Therefore, the store data associated with a store request can be provided to cache 50 via the data port by way of conductors 60.

In the case of a writethrough store request where WT attribute is asserted, the writethrough store access is provided to store buffer 40 for storage into an entry of store buffer queue 44. The store requests with data and signals such as address, WT attributes, or WA attributes may be provided to store buffer 40 via conductors 70. Other signals may be communicated, as needed, between cache 50 and store buffer 40 via conductors 70 as well. The store buffer 40 will operate much as described above to perform a write operation to BIU 14.

Note that additional circuitry may be included in buffer circuitry 40 and cache circuitry 50, but have been omitted from FIG. 2 so as not to complicate the description. For example, buffer circuitry 40 and cache circuitry 50 may also include a linefill buffer and a copyback buffer (not shown) which operates as known in the art. Operation of FIG. 2 will be described in more detail in reference to FIGS. 3-8 below.

FIG. 3 illustrates a storage location, referred to as a store buffer control register 46. The illustrated embodiment is a 32-bit register used for extended store buffer control. The store buffer control register 46 may be located in the store buffer 40, as part of cache 50, or elsewhere in data processing device 10. The store buffer control register depicted has a two bit store gather control (STGC) field 48. This field holds a store gathering policy indicator also referenced by numeral

48. The store gathering policy indicator 48 is used to determine the store gathering policy to be used by the store buffer 40 to control gathering of multiple store requests into a store buffer entry. The store gathering policy indicator 48 may be user programmable. In the illustrated embodiment, the store gathering policy indicator 48 can specify a particular policy to be used, e.g., values "00", "01", "10", or can specify whether an alternate criteria is to be used to determine the policy, e.g., value "11" (FIG. 4). For example, when the store gathering policy indicator 48 is set to "11," the store gathering policy used by the store buffer 40 can be determined by the store buffer control circuitry 42 based on a store request destination address or attributes of a device located at a store destination address. This is described further below.

FIG. 4 illustrates a table of field descriptions showing the options for setting the store gathering policy indicator in the STGC field. The first column shows the designated bits in the store buffer control register 46. Column two illustrates the name assigned to each set of designated bits. The third column provides a description of what data in the designated field of bits reflects. As shown in the embodiment of FIG. 4, the store gathering policy indicator also determines whether or not store gathering is enabled at all (00—store gathering disabled). The store gathering policy indicator indicates whether the constraints exist on gathering data information into a store buffer entry (10—store gathering enabled, constrained). Constrained gathering requires store requests gathered in a store buffer entry to be aligned and contiguous. The store gathering policy indicator will also indicate whether non-contiguous byte strobes are asserted and used for write operations of gathered stores to the BIU (01—store gathering enabled, unconstrained), or whether size signals are used for write operations of gathered stores to the BIU (10—store gathering enabled, constrained). Finally, the setting may be determined based on an address table discussed further below with respect to FIGS. 6 and 7 (11—store gathering depends on address). The STGC field is set at bits 2 and 3 of the store buffer control register, but may be stored at any location in the register.

Figure 5:
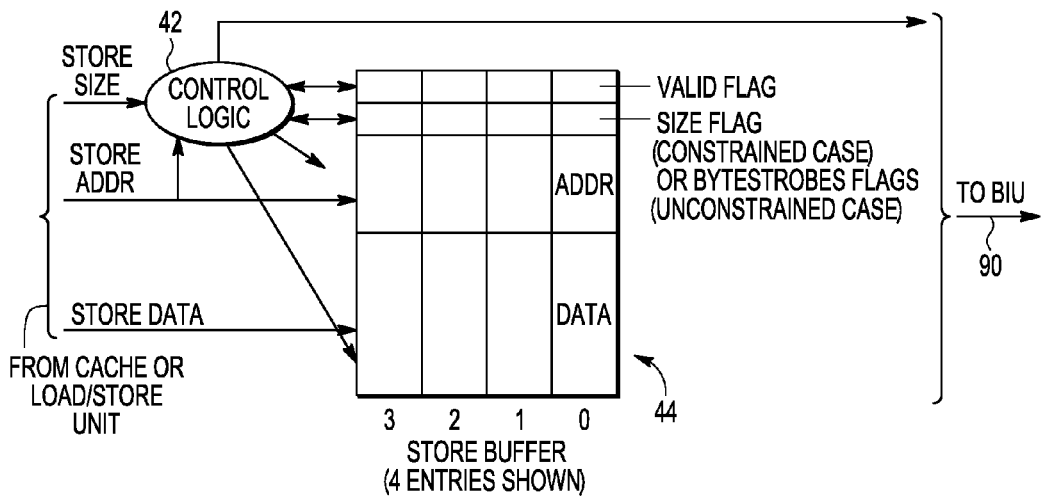
FIG. 5 is a block diagram of the store buffer structure of the store buffer of FIG. 1 in accordance with one embodiment of the present disclosure.

FIG. 5 illustrates the store buffer with store buffer control logic 42 and a store buffer queue 44 having four entries (0-3) in accordance with the example store gathering policy. Store request data size and store request address information are provided to store buffer control logic 42. Each entry contains a validity flag, status field, address field, and data information field. The store address information and store size information may be used by the control logic 42 to determine the store gathering policy. Alternatively, the store gathering policy can be accessed from a control registers, such as that described with reference to FIG. 3. Upon determining the store gathering policy to be implemented, the store buffer control circuitry 42 determines whether store gathering is available in a store buffer entry by seeking to match an address for the incoming new store request. Upon determination that gathering is available, the store buffer control logic gathers store data words into data field of the matched store buffer entry in queue 44. If constrained gathering, a data size flag is set in the status field indicating the alignment and location of contiguous data bytes gathered in the entry. The data size flag will indicate the size of the eventual write operation to BIU 14 via conductor 90. If unconstrained gathering, byte strobe flags are set in the status field indicating the locations of potentially non-adjacent gathered data bytes in the entry. The strobe flags will indicate which byte lanes contain new data in the eventual write operation to BIU 14 via conductor 90.

Figure 6:
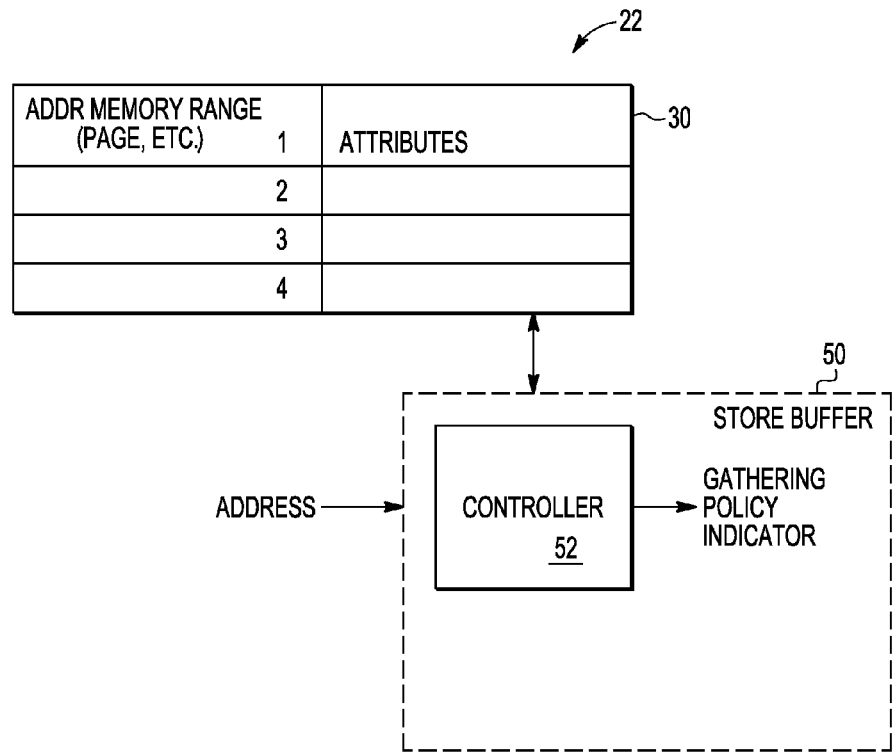
FIG. 6 is a block diagram of the store buffer controller circuitry of FIG. 2 in accordance with one embodiment of the present disclosure.
Figure 7:
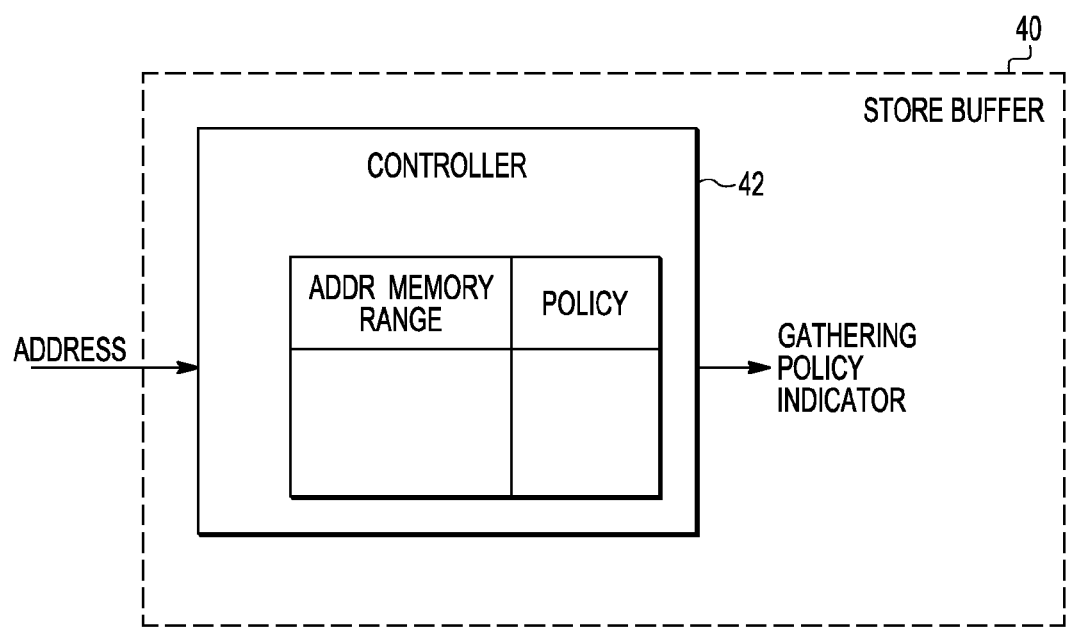
FIG. 7 is another block diagram of the store buffer controller circuitry of FIG. 2 in accordance with another embodiment of the present disclosure.

FIGS. 6 and 7 illustrate two embodiment variants of determining a store gathering policy utilizing an address table 30, e.g., when the control indicator STGC has a value of 11, based upon the memory mapped address range of a memory being accessed, such as memory 13. With respect to FIG. 6, address table 30 is accessed by the controller 42 that associates memory address ranges to specific device attributes associated with devices located at particular address ranges. Thus, in operation, store buffer controller 42 may cross reference the received address information using the address table 30 to determine one or more attributes of a memory or device being accessed, which can be used to determine whether the device at that address range is capable of handling gathering, and more specifically whether the device is capable of handling constrained or unconstrained gathering. For example, an attribute that indicates a memory or device does not support strobe flags would result in the store buffer implementing constrained buffering, instead of unconstrained buffering. Address table 30 may reside in register files 22 as illustrated in FIG. 1, at the store buffer 40, or in other storage locations. By way of example, if a memory device 13 at address range 1 in the address table 30 cannot process or receive byte strobe flags, then the data gathering policy will have to be constrained due to the limitations of the device. Store request size data received at the store buffer control 42, may also be used to determine a size flag for the gathered buffer entry. Additionally, the interface with memory device 13 may only be capable of accommodating data words of a certain size or alignment. That may be reflected in the size flag determined for the store gathered data words in an entry.

FIG. 7 illustrates another embodiment of determining a store gathering policy utilizing a different type address table 30. Address table 30 of FIG. 7 associates memory address ranges to a specific store gathering policy. Store buffer controller 42 may cross reference the received address data with the address table 30 to determine the store gathering policy to be implemented at the store buffer 40. Address table 30 may be received from register files 22 as illustrated in FIG. 1. Alternatively, address table 30 may be stored in the store buffer 40. By way of example, if a memory device 13 at address range 1 in the address table 30 is associated with a constrained store gathering policy, then the store gathering policy indicator for a constrained policy is set. Store request size data received at the store buffer control 42, may determine a size flag for the gathered buffer entry.

Figure 8:
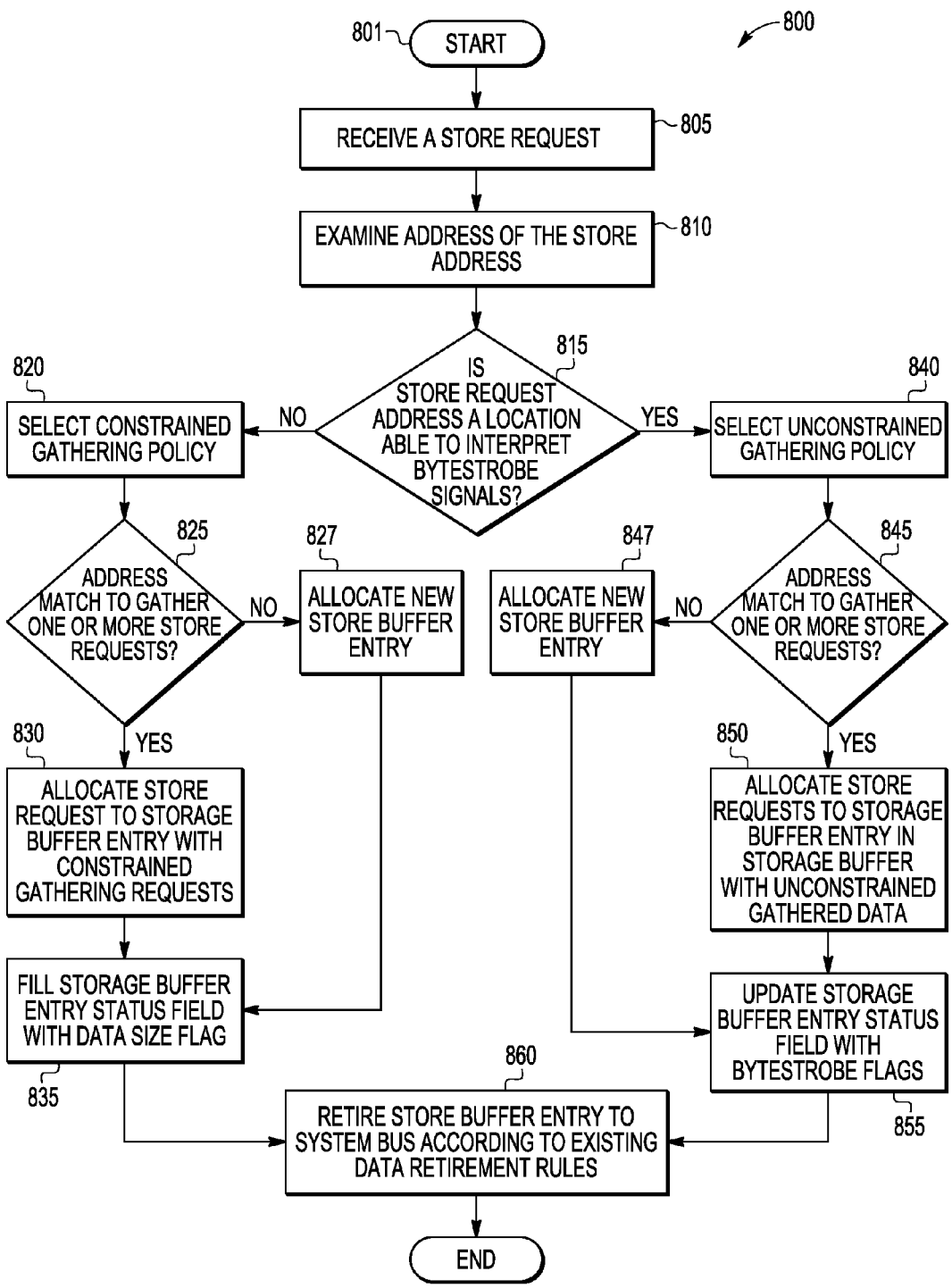
FIG. 8 is a flow diagram of a method of determining the store buffer gathering policy of the data processing device of FIG. 1 in accordance with one embodiment of the present disclosure.

As described above, store gathering policy indicator 48 in the STGC field may indicate no gathering (00—store gathering disabled), constrained gathering (10—store gathering enabled, constrained), unconstrained gathering permitted (01—store gathering enabled, unconstrained), or may be determined on a store request-by-store requested basis based on other factors (11—store gathering depends on address). FIG. 8 illustrates focuses on an embodiment when the store gathering implemented depends on an address or attributes of a device at a destination address (11—store gathering depends on address).

FIG. 8 illustrates, in flow diagram form, operation of buffer circuitry 40 in accordance with one embodiment of the present disclosure that supports use of table 30 to determine the type of gathering to be implemented, if any. Flow 800 begins with start 801 and proceeds to block 805 where buffer 40 receives a new store request (which may also be referred to as a store access request or a store access). This new store request may be received from load/store unit 28, which operates as known in the art, or it may be received from cache 50 which operates as known in the art. Flow proceeds to block 810 where the address of the store request is examined by the store buffer control circuitry 42.

Flow proceeds to decision diamond 815 where it is determined whether the store location destination address is at an interface capable of interpreting byte strobe signals. If not, flow proceeds to block 820 where the store buffer control circuitry 42 selects the constrained store gathering policy indicator, note that the gathering policy indicator 48 (STGC) shown in FIG. 3 will remain set to 11 to allow subsequent store requests to implement the same or different gathering policies. Flow proceeds to block 825 where, the store buffer control circuitry 42 determines if there is an address match with an existing store buffer entry for gathering the new store request. If not, the flow proceeds to block 827 where the store buffer control 42 allocates a new entry in the store buffer queue 44 for the new store request. If there is a gather address match however, the flow proceeds to block 830 to allocate the store request to the matched store buffer entry.

Based on the determination of the store gathering policy indicator, the new store request is allocated under a constrained gathering policy to the matched entry. The data information in the new store request must be merged with the existing data in the matched store buffer entry so that the gathered data information is contiguous and aligned in the buffer entry. The flow proceeds from block 827 to block 835 or from 830 to block 835 where the store buffer control circuitry 42 then fills or updates the storage buffer entry status field of the respective buffer entry with data size flag information. The flow proceeds to block 860 where the store buffer 40 retires each entry in the store buffer queue according to the existing data retirement rules for the store buffer.

If at decision diamond 815 it is determined that the store location destination address is an interface capable of interpreting byte strobe signals, flow proceeds to block 840 where the store buffer control circuitry 42 selects the unconstrained store gathering policy indicator, note that the gathering policy indicator 48 (STGC) shown in FIG. 3 will remain set to 11 to allow subsequent store requests to implement the same or different gathering policies. Flow proceeds to block 845 where, the store buffer control circuitry determines if there is an address match with an existing store buffer entry for gathering the new store request. If not, the flow proceeds to block 847 where the store buffer control 42 allocates a new entry in the store buffer queue 44 for the new store request. If there is a gather address match, the flow proceeds to block 850 to allocate the store request to the matched store buffer entry. Since the new store request is allocated under an unconstrained gathering policy, the data information in the new store request, or a portion thereof, may be merged with the existing data in the matched store buffer entry with or without gaps. The gathered data information may be non-contiguous. The flow proceeds from block 847 to block 855 or from block 850 to block 855 where the store buffer control circuitry 42 updates the storage buffer entry status field of the respective entry with current byte strobe flag information. The flow then proceeds to block 860 where the store buffer 40 retires each entry in the store buffer queue according to the existing data retirement rules for the store buffer.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. For example, store buffer 40 and cache circuitry 50 in FIG. 1 are depicted as separate logical blocks and cache circuitry 50 is even optional in some embodiments of the present disclosure. However, store buffer 40 and cache circuitry 50 may be implemented in some architectures as a single logical block with shared or overlapping control circuitry.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 or portions thereof may be embodied in a hardware description language of any appropriate type. In another embodiment, system 10 is a computer system such as a personal computer system or other type of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method comprising:
   determining a store gathering policy indicator of a data processor device;
   selectively enabling a store gathering policy indicating a type of data gathering to be used based on the store gathering policy indicator;
   storing a set of data information in an entry of a store buffer based upon the store gathering policy; and
   providing a store request that includes the set of data information in the entry.

2. The method of claim 1 further comprising:
in response to the store gathering policy being enabled, storing non-contiguous data information at non-adjacent bytes of the entry.

3. The method of claim 1 further comprising:
in response to the store gathering policy being enabled, storing strobe flags for an entry of a store buffer, the strobe flags indicative of positions of valid data information stored in an entry of the store buffer.

4. The method of claim 1 further comprising:
in response to the store gathering policy being enabled, storing a size flag for the entry, the size flag indicative of a size of the set of data information.

5. The method of claim 1 wherein the store gathering policy is determined by a user programmable storage location.

6. The method of claim 1 wherein the store gathering policy is determined based upon a destination address where the data information is to be stored.

7. The method of claim 6 wherein the store gathering policy is determined based upon attributes of a memory, wherein the memory includes a destination address where the data information is to be stored.

8. The method of claim 1 wherein the set of data information includes data information from one or more store instructions of a data processor unit pipeline.

9. The method of claim 1 wherein the type of data gathering to be used is selected from at least a no gathering type, a constrained gathering type, or an unconstrained gathering type.

10. A method comprising:
determining a first store gathering policy based upon a gathering indicator of a data processor;
gathering data information from a plurality of store requests at an entry of a store buffer entry based upon the first store gathering policy indicating a type of data gathering to be used; and
retiring each one of the store requests of a plurality of store requests at a corresponding device of the data processor.

11. The method of claim 10 wherein the first store gathering policy results in non-contiguous data information being stored at non-adjacent bytes of the entry, and a second store gathering policy of the plurality of store gathering policies, when selected, does not result in non-contiguous data information being stored at non-adjacent bytes of the entry.

12. The method of claim 11 wherein the first store gathering policy results in strobe flags being stored at an entry, and a second store gathering policy of the plurality of store gathering policies, when selected, does not result in strobe flags being stored at the entry, the strobe flags indicative of addresses of valid data information stored at the store buffer.

13. The method of claim 10 wherein the first store gathering policy results in a size flag being stored at an entry, and a second store gathering policy of the plurality of policies, when selected, does not result in the size flag being stored at the entry, the size flag indicative of a size of the set of data information.

14. The method of claim 10 wherein the store gathering policy is determined by a user programmable storage location.

15. The method of claim 10 wherein determining the store gathering policy includes determining the store gathering policy based upon a destination address where the data information is to be stored.

16. A device, comprising:
a data processing core to initiate store requests;
a system bus coupled to a bus interface unit to communicate store requests;
a store buffer comprising a store buffer control module coupled to the data processing core to receive a plurality of store requests from a source and to determine a type of data gathering to be used, from a plurality of types of data gathering, to be implemented at the store buffer.

17. The device of claim 16, wherein the plurality of types of data gathering include one type of data gathering that stores non-contiguous data information at an entry of the store buffer and another type of data gathering that does not store non-contiguous data at the store buffer.

18. The device of claim 16, wherein the plurality of types of data gathering includes one type of data gathering that stores strobe flags at an entry of the store buffer having gathered data, and another type of data gathering that does not store strobe flags, the strobe flags indicative of positions of valid data information stored in an entry of the store buffer.

19. The device of claim 16, wherein the plurality of types of data gathering includes one type of data gathering that stores a size flag at an entry of the store buffer, and another type of data gathering that does not store a size flag, the size flag indicative of data information of a store request.

20. The device of claim 16, further comprising a user programmable storage location, wherein the store buffer control module is to determine the type of gathering based upon the user programmable storage location.

21. The device of claim 16, wherein the store buffer control module is to determine the store gathering policy based upon a destination address where the data information is to be stored.

* * * * *